(12) United States Patent
Nakamura et al.

(10) Patent No.: US 9,389,494 B2
(45) Date of Patent: Jul. 12, 2016

(54) APPARATUS FOR PROJECTION AND METHODS FOR USING THE SAME

(71) Applicants: Michael Nakamura, Crystal Lake, IL (US); Bryan Katzel, Crystal Lake, IL (US); James D. Morrow, Oak Park, IL (US)

(72) Inventors: Michael Nakamura, Crystal Lake, IL (US); Bryan Katzel, Crystal Lake, IL (US); James D. Morrow, Oak Park, IL (US)

(73) Assignee: Bem Wireless LLC, Woodstock, IL (US)

( * ) Notice: Subject to any disclaimer, the term of this patent is extended or adjusted under 35 U.S.C. 154(b) by 0 days.

(21) Appl. No.: 14/149,472

(22) Filed: Jan. 7, 2014

(65) Prior Publication Data
US 2014/0198305 A1    Jul. 17, 2014

Related U.S. Application Data

(60) Provisional application No. 61/749,577, filed on Jan. 7, 2013.

(51) Int. Cl.
*G03B 21/14*    (2006.01)
*G03B 21/30*    (2006.01)

(52) U.S. Cl.
CPC .............. *G03B 21/145* (2013.01); *G03B 21/30* (2013.01); *G03B 21/142* (2013.01)

(58) Field of Classification Search
CPC . G03B 21/142; G03B 21/145; G03B 21/2053
USPC .................. 353/72, 74, 79, 119, 121, 122
See application file for complete search history.

(56) References Cited

U.S. PATENT DOCUMENTS

| | | | |
|---|---|---|---|
| 7,670,009 B2* | 3/2010 | Hirata et al. ................ | 353/79 |
| 2003/0151922 A1* | 8/2003 | Peng et al. .................. | 362/372 |
| 2005/0088631 A1* | 4/2005 | Dwyer et al. ............... | 353/101 |
| 2006/0114431 A1* | 6/2006 | Ushiro ....................... | 353/119 |
| 2008/0055565 A1* | 3/2008 | Solomon et al. ............ | 353/72 |
| 2012/0273644 A1 | 11/2012 | Lin | |

FOREIGN PATENT DOCUMENTS

| | | |
|---|---|---|
| JP | 2006-047893 A | 2/2006 |
| JP | 2011-188215 A | 9/2011 |
| KR | 10-2008-0079725 A | 9/2008 |
| KR | 10-2012-0019289 A | 3/2012 |

OTHER PUBLICATIONS

International Search Report for counterpart PCT Pat. App. No. PCT/US2014/0106509.
International Preliminary Report on Patentability, PCT Pat. App. No. PCT/US2014/010509, dated Jul. 16, 2015.

* cited by examiner

*Primary Examiner* — Sultan Chowdhury
(74) *Attorney, Agent, or Firm* — Scherrer Patent & Trademark Law, P.C.; Stephen T. Scherrer; Monique A. Morneault

(57) ABSTRACT

The present invention relates to a projection apparatus capable of projecting high quality video in a convenient mobile casing. Specifically, the present invention relates to a projector, which is disposed within a casing in alignment with the casing having a handle in a first configuration. More, specifically, the projector may be rotatably positioned within the casing into a second configuration to focus a video image against a background.

26 Claims, 7 Drawing Sheets

APPARATUS FOR PROJECTION AND METHODS FOR USING THE SAME

This application claims priority under 35 U.S.C. 119(e) to U.S. Provisional Patent Application No. 61/749,577, filed on Jan. 7, 2013, which is incorporated by reference herein in its entirety.

TECHNICAL FIELD

The present invention relates to a projection apparatus capable of projecting high quality video in a convenient mobile casing. Specifically, the present invention relates to a projector, which is disposed within a casing in alignment with the casing having a handle in a first configuration. More, specifically, the projector may be rotatably positioned within the casing into a second configuration to focus a video image against a background. Specifically, the casing supports the projector in the second configuration, such that the projection apparatus may stand freely on its own. The casing includes a kickstand that is flush with the casing in the first configuration and is rotatably positioned away from the casing to create a stand for use in the second configuration.

BACKGROUND

It is, of course, generally known to project images onto backgrounds. The first projection dates back to the $4^{th}$ century with pinhole projections, whereby light traveled through small holes and inverted the image. Early adaptations led to the first image projector, which used a lantern to pass light through a translucent window holding an image. Recent adaptations include overhead, slide, and movie projectors, all of which use translucent images and light to create images.

More recently, digital images have replaced the previously used translucent images. Images from computers, video cameras, or cable broadcasts can be projected using modern video projectors. Many technologies exist to achieve digital projection including but not limited to CRT (cathode ray tube), LCD (liquid crystal display), DLP (digital light processing), LCoS (liquid crystal on silicon), LED (light emitting diode), and Laser Diode projectors. Generally, these projectors are relatively bulky and fragile, and typically are difficult to transport and set up where needed to project an image. In many cases, it is desirable to have projectors that are mobile, so that a user may utilize a projection in any location desired, such as during a presentation for others, or for watching a movie or other entertainment on a screen or a wall.

Regularly, projectors are difficult to move because of their expensive, bulky, and fragile nature. Specifically, modern projectors utilize a high power light source that may easily break, that may project an image through a lens, which may also be fragile. Other parts of a projection include fans, PCB boards, connectors for inputting media signals, and other like parts. These may also be relatively fragile, and may, together, create a relatively heavy apparatus that may be somewhat large and difficult to move.

Moving expensive, bulky, and fragile devices compels a person to act slowly and meticulously in order to avoid dropping or damaging the devices. Commonly, projector cases or bags are sold to hold video projectors during travel. Frequently moving the projectors in and out of cases or bags increases the risk of damaging the projectors. Further, most cases and bags are soft-shelled cases and do not provide much rigid support for video projectors.

Frequently, when a video projector is used, it is mounted to prevent damage and ensure a static picture. It is common to mount a video projector to a ceiling to keep the device from being handled, and for keeping the device out of range of users. However, ceiling mounting a projector, while generally freeing the projector from harm, may cause it to be beyond reach for easy adjustments. Further, once a projector is mounted, it is very difficult to move or remove it.

As mentioned, transporting projectors is generally known, especially for those who use the projector for presentations in different locations, or for individuals who wish to use the projectors for entertainment purposes. However, setting up a projector to project an image onto a screen, wall or other surface, may be very difficult to do. Most projectors have adjustable pads or feet that may be moved upwardly or downwardly to dial in the image to the correct level or at the proper location on the screen, wall or other surface. Manually adjusting these pads or feet is time-consuming and difficult. Oftentimes, a projector may be required to project toward a surface, and additional materials must be used to ramp the projector upwardly or downwardly to aim the projected image at the proper place. Books, magazines, and other like material are commonly used to do so.

A need, therefore, exists for an apparatus that digitally projects an image that may be easily adjustable, allowing a user to project an image at a proper location easily, quickly and efficiently. Moreover, a need exists for an apparatus for digitally projecting an image that is easily transportable, allowing a user to handle the apparatus easily, set the apparatus quickly, and control the projected image as desired.

Further, a need exists for an apparatus for projecting an image that is relatively petite, stable and sturdy. Still further, a need exists for an apparatus for projecting an image that is supported when set up to stably project an image.

In addition, a need exists for an apparatus for projecting an image that is easily accessible when set for making quick and easy changes to the projected image. Moreover, a need exists for an apparatus for projecting an image that is highly mobile, allowing a user to quickly pack and transport when desired.

SUMMARY OF THE INVENTION

The present invention relates to a projection apparatus capable of projecting high quality video in a convenient mobile casing. Specifically, the present invention relates to a projector, which is disposed within a casing in alignment with the casing having a handle in a first configuration. More, specifically, the projector may be rotatably positioned within the casing into a second configuration to focus a video image against a background. Specifically, the casing supports the projector in the second configuration, such that the projection apparatus may stand freely on its own. The casing includes a kickstand that is flush with the casing in the first configuration and is rotatably positioned away from the casing to create a stand for use in the second configuration.

To this end, in an embodiment of the present invention, an apparatus for digitally projecting an image is provided. The apparatus comprises a projector capable of projecting video, and a casing, wherein the projector is rotatably disposed within the casing.

In an alternate embodiment of the present invention, a method of using a projection apparatus is provided. The method for using the projection apparatus comprises the steps of providing a projection apparatus having a projector capable of projecting video, and a casing, wherein the projector is rotatably disposed within the casing, rotating the projector within the casing, standing the projection apparatus a distance away from a projection surface, and projecting an image onto the background.

It is, therefore an advantage and objective of the present invention to provide an apparatus for digitally projecting an image that may be easily adjustable, allowing a user to project an image at a proper location easily, quickly and efficiently.

Moreover, it is an advantage and objective of the present invention to provide an apparatus for digitally projecting an image that is easily transportable, allowing a user to handle the apparatus easily, set the apparatus quickly, and control the projected image as desired.

Further, it is an advantage and objective of the present invention to provide an apparatus for projecting an image that is relatively petite, stable and sturdy.

Still further, it is an advantage and objective of the present invention to provide an apparatus for projecting an image that is supported when set up to stably project an image.

In addition, it is an advantage and objective of the present invention to provide an apparatus for projecting an image that is easily accessible when set for making quick and easy changes to the projected image.

Moreover, it is an advantage and objective of the present invention to provide an apparatus for projecting an image that is highly mobile, allowing a user to quickly pack and transport when desired.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to a projection apparatus capable of projecting high quality video in a convenient mobile casing. Specifically, the present invention relates to a projector, which is disposed within a casing in alignment with the casing having a handle in a first configuration. More, specifically, the projector may be rotatably positioned within the casing into a second configuration to focus a video image against a background. Specifically, the casing supports the projector in the second configuration, such that the projection apparatus may stand freely on its own. The casing includes a kickstand that is flush with the casing in the first configuration and is rotatably positioned away from the casing to create a stand for use in the second configuration.

Now referring to the figures, wherein like numerals refer to like parts, FIGS. 1A-1E illustrate a projection apparatus 10 in a first configuration in a preferred embodiment of the present invention. The projection apparatus 10 may be thinly shaped as shown in the top view shown in FIG. 1A and the side view shown in FIG. 1D to generally fit within a casing 12 in the manner shown in the figures, when aligned with the casing 12 in the first configuration. The projection apparatus 10 may comprise the casing 12 encapsulating a projector 14 therein. The casing 12 may be made from a hard, rigid material such as plastic, metal, rubber, or any other alternate rigid material known to one skilled in the art.

Figure 1A:
FIG. 1A illustrates a top view of a projection apparatus in a first configuration in a preferred embodiment of the present invention.
Figure 1B:
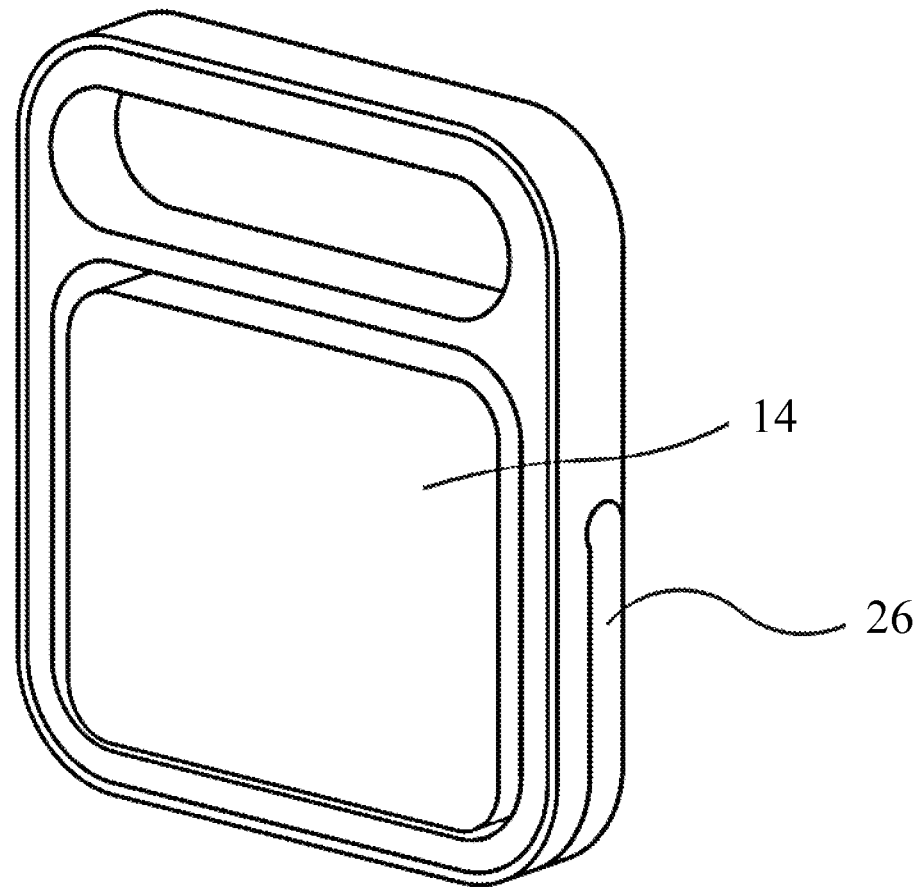
FIG. 1B illustrates a perspective view of a projection apparatus in a first configuration in a preferred embodiment of the present invention.
Figure 1C:
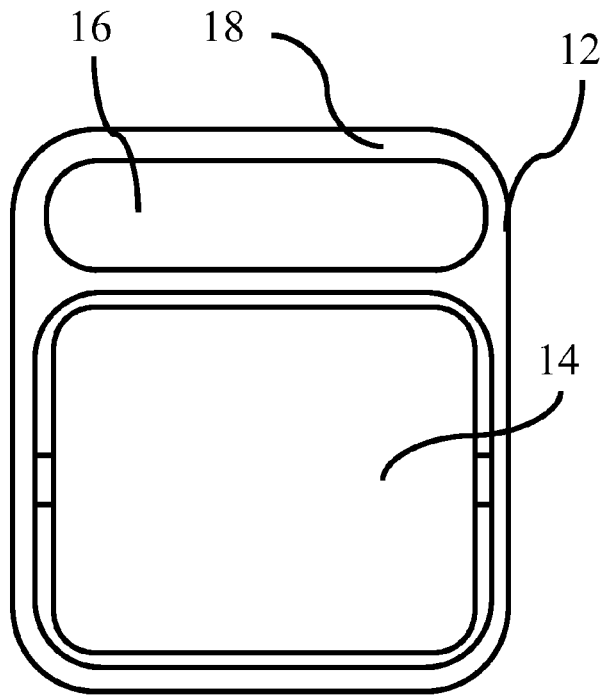
FIG. 1C illustrates a front view of a projection apparatus in a first configuration in a preferred embodiment of the present invention.
Figure 1D:
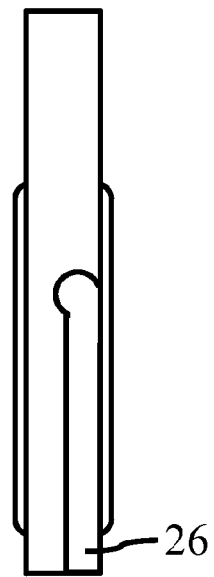
FIG. 1D illustrates a side view of a projection apparatus in a first configuration in a preferred embodiment of the present invention.
Figure 1E:
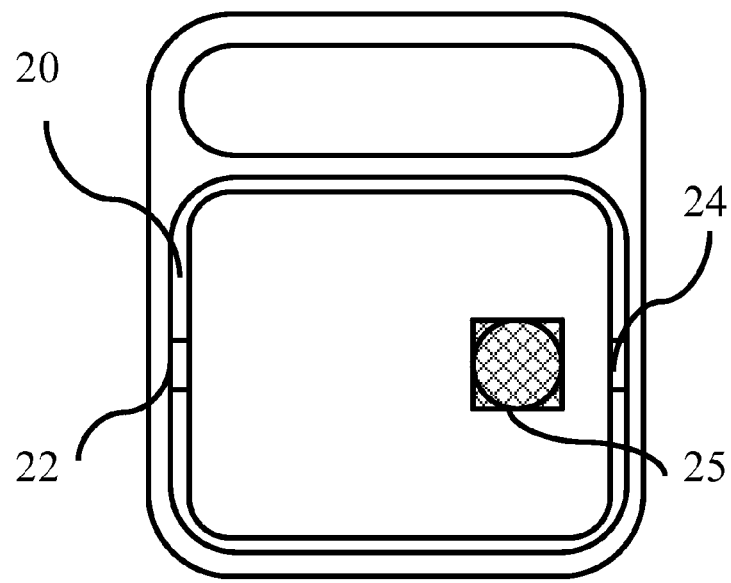
FIG. 1E illustrates a rear view of a projection apparatus in a first configuration in a preferred embodiment of the present invention.

The casing 12 may comprise an opening 16 that may create a handle 18 for carrying the projection apparatus 10. The casing 12 may further comprise a cavity 20 and a kickstand 26. The casing 12 may have attachment means for holding and suspending the projector 14 within the cavity 20 by supporting the projector 14 via a plurality of rotational devices 22, 24. The plurality of rotational devices 22, 24 may be centered about the projector 14 as shown in FIG. 1C and FIG. 1E. The projector 14 may rotate about the plurality of rotational devices 22, 24 within the cavity 20 into a second configuration as illustrated in FIGS. 2A-2E.

Among other features, the projector 14 may project static images, but preferably may project video, including digital video, and other like media, apparent to one of ordinary skill in the art. Moreover, the projector 14 may have required components to project images onto a surface, including for example, a lens, light engine, a control board, and a fan or other cooling apparatus. For example, the projector 14 may comprise a fan intake 25, shown in FIG. 1E, for cooling the projector 14 during use.

In FIGS. 2A-2E, the projection apparatus 10 is shown in a second configuration in the preferred embodiment of the present invention. The projection apparatus 10 may stand freely on a surface (not shown), such as a table top, or other like surface, when the kickstand 26 is rotatably positioned away from the casing 12 via rotatable pins or other rotatable mechanisms 27 that may rotatably connect the kickstand 26 to the casing 12. The kickstand 26 may be rotated through an arc, such as, for example, between about zero degrees and ninety degrees or less away from the casing 12.

The projector 14, rotatably attached to the casing 12, may be rotated in an arc that allows the projector 14 to be disposed in a position to project an image toward a surface, such as a screen, wall or other like surface. Preferably, the projector 14 may rotate away from the casing 12 in an arc between about zero degrees and any other angle allowing the projector to accomplish projecting an image toward a surface. Most preferably, the projector 14 may rotate in an arc between about zero degrees and about one hundred thirty-five degrees away from the casing 12, such that the projector 14 is roughly parallel with the surface (not shown) below the projection apparatus 10, such as a table top or the like. Of course, the projector 14 may be positioned at an alternate angle in order to project an image higher or lower on a screen, wall or other surface, as desired.

Figure 2A:
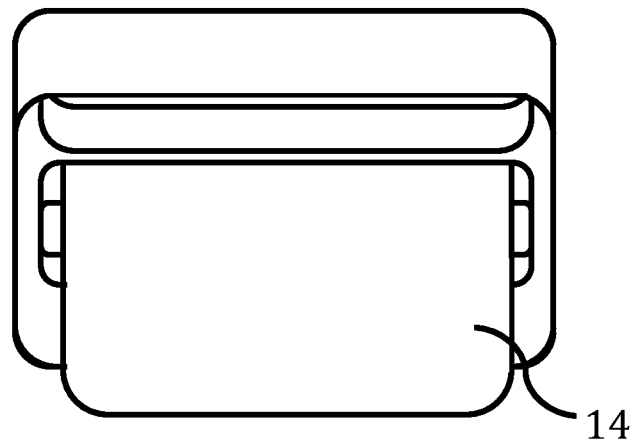
FIG. 2A illustrates a top view of a projection apparatus in a second configuration in a preferred embodiment of the present invention.
Figure 2B:
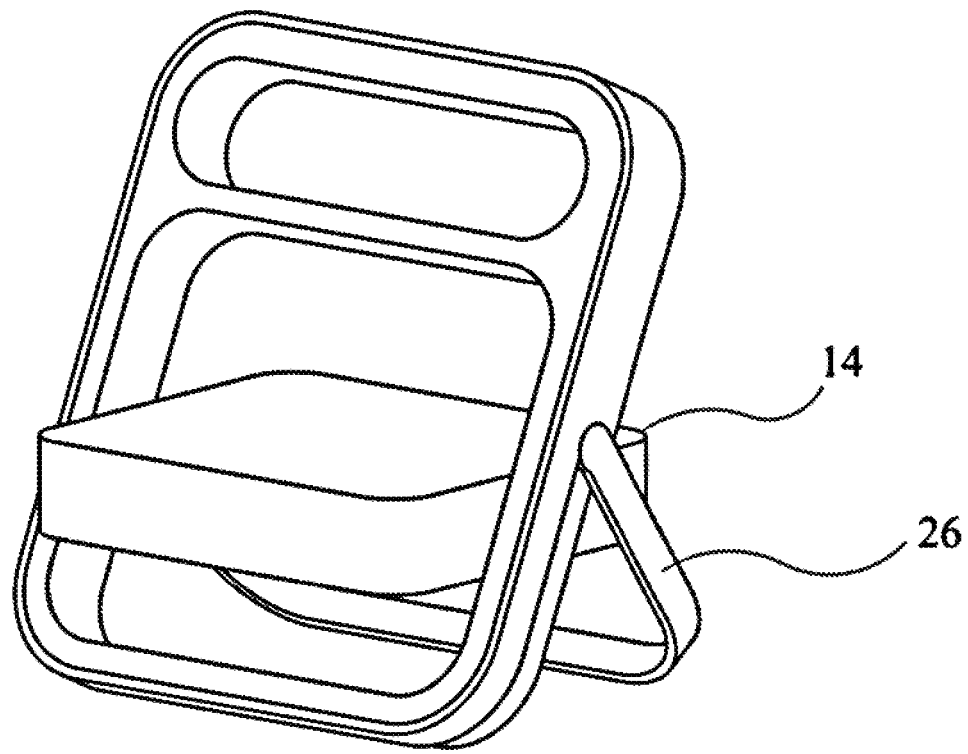
FIG. 2B illustrates a perspective view of a projection apparatus in a second configuration in a preferred embodiment of the present invention.
Figure 2C:
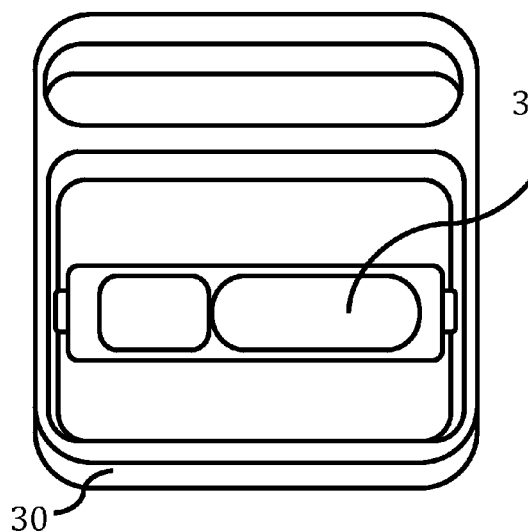
FIG. 2C illustrates a front view of a projection apparatus in a second configuration in a preferred embodiment of the present invention.
Figure 2D:
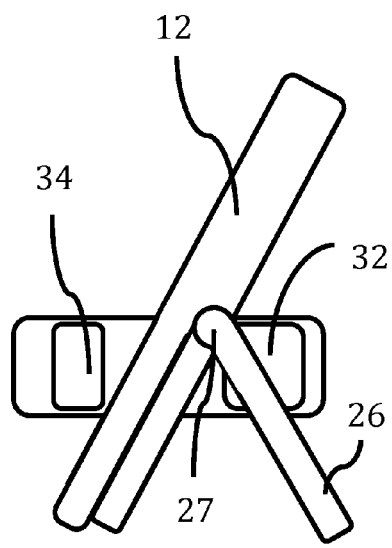
FIG. 2D illustrates a side view of a projection apparatus in a second configuration in a preferred embodiment of the present invention.
Figure 2E:
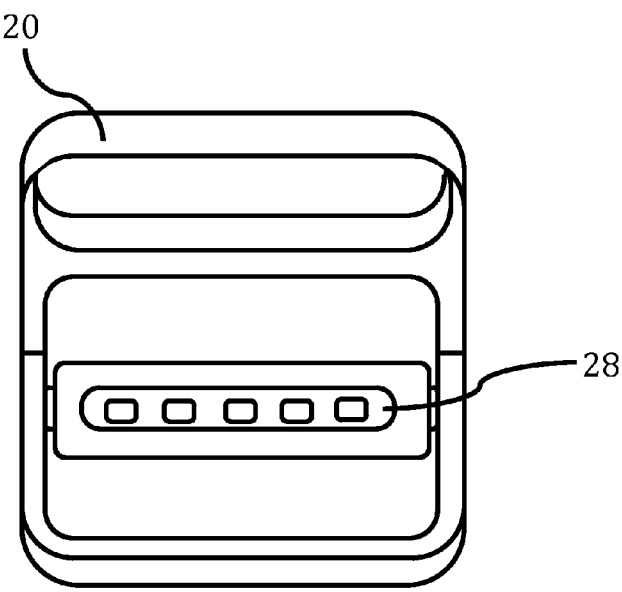
FIG. 2E illustrates a rear view of a projection apparatus in a second configuration in a preferred embodiment of the present invention.

The projector 14 may comprise a row of connectors 28, as shown in FIG. 2E, for connecting the projector 14 to a power source (not shown), a visual input signal (not shown), and/or an audio input signal (not shown). Of course, any number of connections known to one skilled in the art may be on the projector 14 so that the projector 14 properly presents high quality video and audio, such as VGA, HDMI, USB, RCA video, component video, or the like. In addition, the projector 14 may be wirelessly connected to a media source, such as via WiFi, Bluetooth, or other like wireless protocol.

The projector 14 may also comprise a fan exhaust 30, shown in FIG. 2C, for cooling the projector 14 during use. The audio signal (not shown) may be heard through one or a plurality of side mount speakers 32, shown in FIG. 2D. The projector 14 may comprise a focus adjustment wheel 34, as shown in FIG. 2D, for focusing a projected image on a background (not shown). Although the figures of the present invention show the various components of the projector 14 in a single configuration, it should be noted that the components may be arranged in any manner for providing the projector 14 its usability to project images, as apparent to one of ordinary skill in the art.

Figure 3:
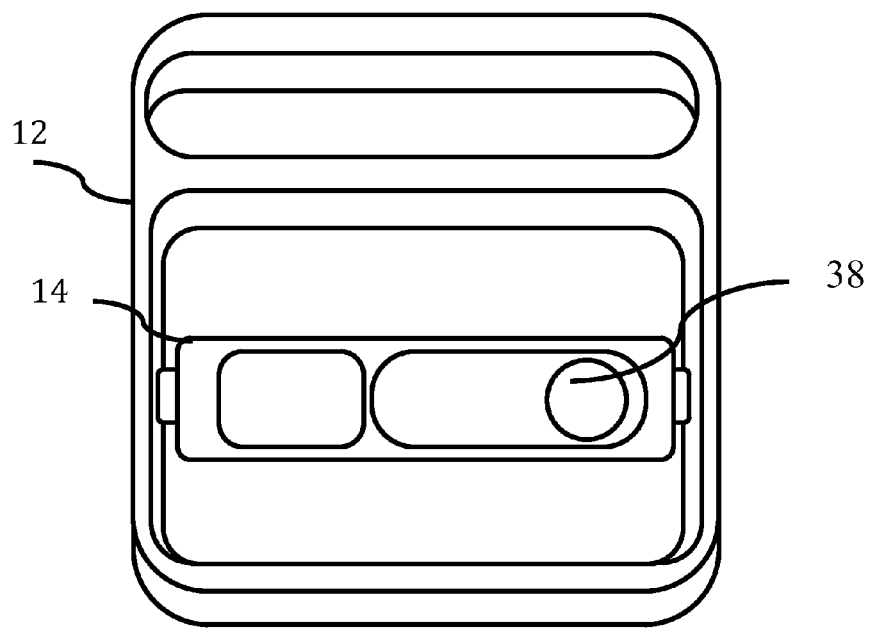
FIG. 3 illustrates a front view of a projection apparatus with a lens exposed in an embodiment of the present invention.

The projection apparatus 10 may further comprise a remote control 36 as shown in FIG. 2C. The remote control 36 may double as a lens cap, protecting the lens of the projector 14 from dust, scratches, or other damage when not in use. The remote control 36 may remotely control the operations of the projector 14 when in use. The remote control 36 may be removed, exposing lens 38, as shown in the front view of the projection apparatus 10, in FIG. 3. The lens 38 may project images, static or video, onto a screen, wall or other surface (not shown).

Figure 4:
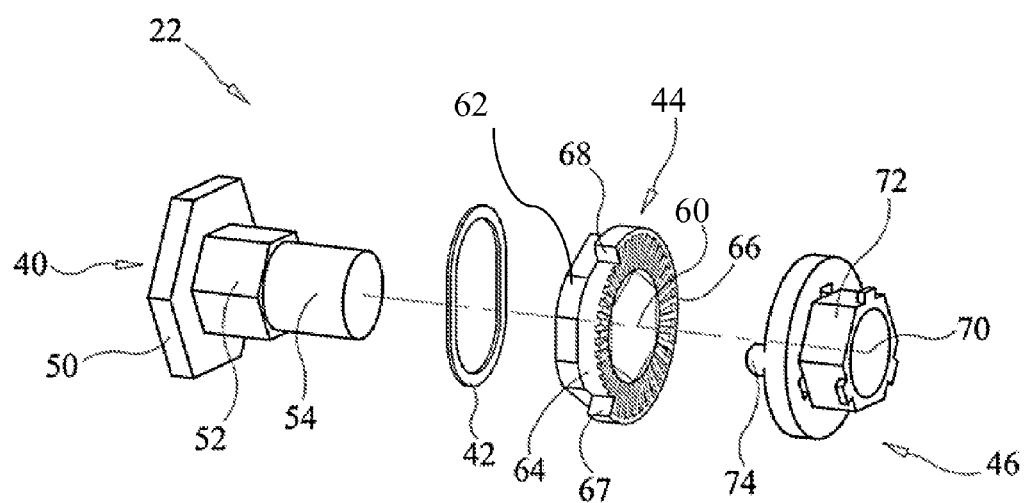
FIG. 4 illustrates an exploded view of a rotational device in an embodiment of the present invention.

An exploded view of the rotational device 22 is shown and described in FIG. 4. The rotational device 22 may be made of a plurality of components including a pivot post 40, a wave spring 42, a spring-loaded hub 44, and a stationary hub 46. The pivot post 40 may comprise an end piece 50, a polygonal piece 52, and a cylindrical piece 54. The wave spring 42 may be a single loop or may be multiple loops as needed. The wave spring 42 may fit against the end piece 50, leaving a distance between the wave spring 42 and the cylindrical piece 54.

The spring-loaded hub 44 may comprise a polygonal opening 60 that may fit around the polygonal piece 52 of the pivot post 40. The spring-loaded hub 44 may further comprise a spring base 62, a range of motion chamber 64, and a plurality of indentations 66. The stationary hub 46 may comprise a cylindrical opening 70 that may fit around the cylindrical piece 54 of the pivot post 40. The stationary hub 46 may also comprise a connector 72, a range of motion stopper 74, and a plurality of edges (not shown). The plurality of edges (not shown) may be shaped to fill the plurality of indentations 66, and may provide resistance for the rotation of the spring-loaded hub 44 against the stationary hub 46, thereby locking the projector 14 in place when not manipulated by a user. The connector 72 may connect the stationary hub 46 to the projector 14 to allow the projector 14 to rotate against the spring-loaded hub 44, as desired by the user thereof.

The spring-loaded hub 44 may connect with the stationary hub 46, wherein the plurality of edges (not shown) of the stationary hub 46 generally fit into the plurality of indentations 66 of the spring-loaded hub 44 and the range of motion stopper 74 of the stationary hub 46 fits into the range of motion chamber 64 of the spring-loaded hub 44. When connected, the spring-loaded hub 44 and the stationary hub 46 may not move independently of each other. The spring-loaded hub 44 and the stationary hub 46 may fit against the wave spring 42 on the pivot post 40, such that the spring base 62 of the spring-loaded hub 44 may contact the wave spring 42. The spring-loaded hub 44 may be pressed against the wave spring to release the stationary hub 46 from the plurality of indentations 66 of the spring-loaded hub 44. When the stationary hub 46 is released from the spring-loaded hub 44, the stationary hub 46 may rotate throughout a range of motion defined by the range of motion chamber 64. The stationary hub 46 may rotate through the range of motion chamber 64 until the range of motion stopper 74 contacts an edge 67, 68 of the range of motion chamber 64.

Figure 5:
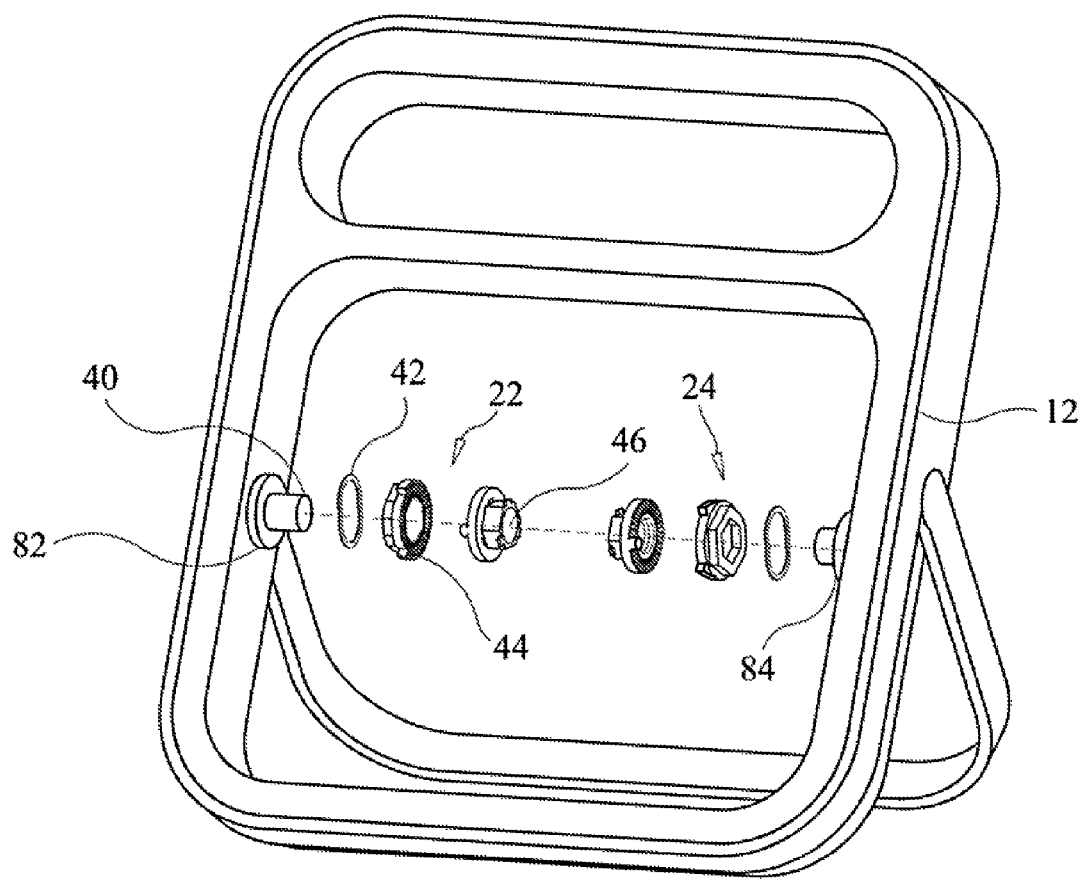
FIG. 5 illustrates a partially exploded view of a casing comprising a rotational device in an embodiment of the present invention.

FIG. 5 shows the rotational devices 22, 24 within the casing 12. The casing 12 may have a plurality of indentations 82, 84, wherein the rotational devices 22, 24 may fit within. The indentations 82, 84 may be circular or another shape known to one skilled in the art, such that the stationary hub 46 may fit and rotate within the casing 12. The pivot post 40 may be disposed within the casing 12 while the wave spring 42, spring-loaded hub 44, and stationary hub 46 are disposed outside the casing 12, so that the pivot post 40 does not move independently of the casing 12. Alternatively, the pivot post 40 may be polygonal, star-shaped, or other shape known to one skilled in the art and fit into a polygonal, star-shaped, or other shaped recess, so that the pivot post 40 does not move independently of the casing 12. The stationary hub 46 generally sits within pivot attachment points 90 (as shown in FIG. 6) within the sides of the projector 14, allowing the projector 14 to rotate in relation to the casing 12.

Figure 6:
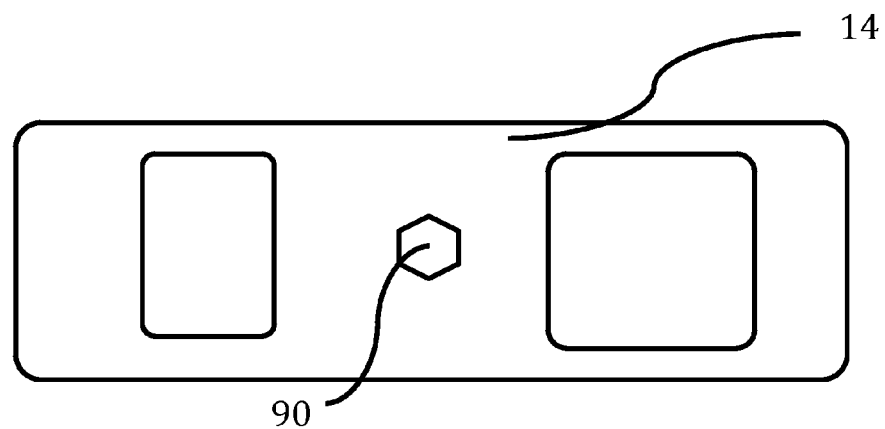
FIG. 6 illustrates a side view of a projector in an embodiment of the present invention.

FIG. 6 shows a side view of the projector 14. The projector 14 may further comprise a plurality of pivot attachment points 90. The plurality of pivot attachment points 90 may allow the rotational devices to attach the projector 14 to the casing. The plurality of pivot attachment points 90 may also allow the projector 14 to be released from the casing in order to be cleaned or serviced.

Figure 7:
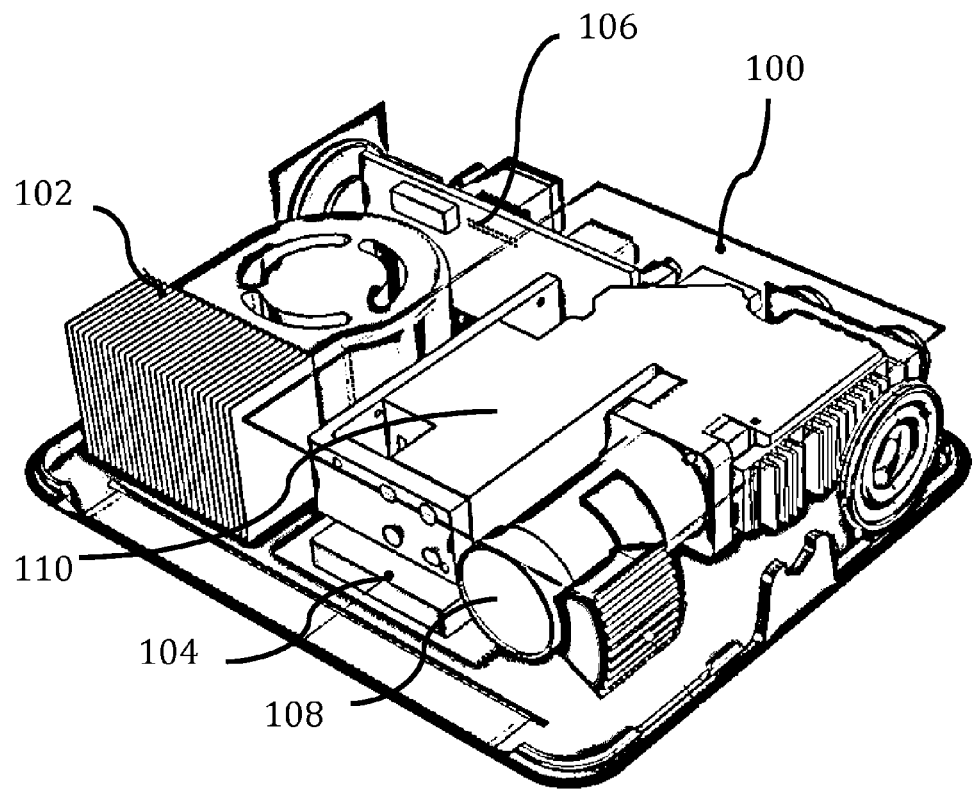
FIG. 7 illustrates an internal view of a projector in an embodiment of the present invention.

FIG. 7 shows the internal components of the projector 14. As noted previously, the configuration of components of the projector 14 may be as shown, or may be any configuration apparent to one of ordinary skill in the art. The projector 14 may comprise a PC board 100, a heat pump and fan 102, a Wi-Fi board 104, a power supply board 106, a lens 108, and a light-emitting chamber 110. The heat pump and fan 102 may be used to cool down the projector 14. The Wi-Fi board 104 may allow wireless access to projector 14 and may allow a user to wirelessly transmit visual and audio media to the projector 14. For example, the Wi-Fi board 104 may perform similar functions to Internet television. The power supply board 106 may provide the projector 14 and each component with power to perform. The lens 108 may project images that are generated in the light-emitting chamber 110 onto a background. These components may be interconnected to provide the projection of images onto a background.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

We claim:

1. A projecting apparatus, comprising:
   a casing;
   a cavity formed within the casing, the cavity having a first side and a second side; and
   a projector capable of displaying images, wherein the projector is disposed within the cavity and rotatably connected to the first side of the casing at about a midpoint of a length of the first side, and further rotatably connected to the second side of the casing at about a midpoint of a length of the second side.

2. The projecting apparatus of claim 1 further comprising a wireless remote, wherein the wireless remote is removably attachable over a lens of the projector.

3. The projecting apparatus of claim 1 further comprising an extension disposed on the casing in a first configuration, wherein the extension is capable of supporting the casing in a second configuration.

4. The projecting apparatus of claim 3 wherein the extension is rotatable.

5. The projecting apparatus of claim 4 wherein the extension is flush with the casing in the first configuration and rotates away from and supports the casing in the second configuration.

6. The projecting apparatus of claim 1 further comprising a handle disposed within the casing.

7. The projecting apparatus of claim 1 further comprising a rotation device disposed at a midpoint in the casing, wherein the rotation device is capable of rotating the projector within the casing.

8. The projecting apparatus of claim 7 wherein the rotation device comprises:
   a base;
   a spring;
   a first hub having a first opening, wherein a plurality of grooves are disposed on a first side of the first hub; and
   a first portion disposed on and extending from the base, wherein the first portion is capable of receiving the spring and the first hub.

9. The projecting apparatus of claim 8 wherein the first opening and the first portion are polygonally shaped.

10. The projecting apparatus of claim 8 wherein the first hub further comprises a chamber disposed on a second side of the first hub, wherein the chamber is capable of receiving a stopper.

11. The projecting apparatus of claim 8 wherein the rotation device further comprises:
    a second hub having a second opening, wherein a plurality of ridges are disposed on a first side of the second hub and further wherein the plurality of ridges are capable of mating with the plurality of grooves of the first side of the first hub; and
    a second portion extending from the first portion, wherein the second portion is capable of receiving the second hub.

12. The projecting apparatus of claim 11 wherein a second side of the second hub is attached to the projector.

13. The projecting apparatus of claim 11 wherein the second opening and the second portion are cylindrically shaped.

14. The projecting apparatus of claim 11 wherein the second hub further comprises a stopper disposed on a second side of the second hub, wherein the stopper is capable of being inserted into a chamber.

15. A method for using a projecting apparatus, the method comprising the steps of:
    providing a casing further comprising a cavity having a first side and a second side and a projector capable of projecting images, wherein the projector is disposed within the cavity and rotatably connected to the first side of the cavity at about a midpoint of a length of the first side, and further rotatably connected to the second side of the cavity at about a midpoint of a length of the second side; and
    rotating the projector within the casing.

16. The method of claim 15 further comprising the step of projecting an image onto a projection surface.

17. The method of claim 15 further comprising the step of:
    providing a rotation device comprising a base, a spring, a first hub having a polygonal opening, wherein a plurality of grooves are disposed on a first side of the first hub and a chamber is disposed on a second side of the first hub, a polygonal portion disposed on and extending from the base, wherein the polygonal portion is capable of receiving the spring and the first hub, a second hub having a cylindrical opening, wherein a plurality of ridges are disposed on a first side of the second hub and further wherein the plurality of ridges are capable of being inserted into the plurality of grooves of the first side of the first hub, a stopper disposed on a second side of the second hub, wherein the stopper is capable of being inserted into the chamber on the second side of the first hub, a cylindrical portion extending from the polygonal portion, wherein the cylindrical portion is capable of receiving the second hub.

18. The method of claim 17 further comprising the steps of:
    pressing the first hub against the spring; and
    releasing the plurality of ridges of the second hub from the plurality of grooves of the first hub.

19. The method of claim 17 further comprising the step of:
    stopping the rotation of the projector at a desired angle, wherein the plurality of ridges on the second hub fit into the plurality of grooves on the first hub and prevent the projector from moving from the desired angle.

20. The method of claim 17 further comprising the step of:
    rotating the second hub until the stopper on the second hub contacts a first end of the chamber on the first hub.

21. A projecting apparatus, comprising:
    a casing;
    a projector capable of displaying images, wherein the projector is rotatably disposed within the casing;
    a rotation device disposed at a midpoint in the casing, wherein the rotation device is capable of rotating the projector within the casing, the rotation device comprising:
    a base;
    a spring;
    a first hub having a first opening, wherein a plurality of grooves are disposed on a first side of the first hub; and a first portion disposed on and extending from the base, wherein the first portion is capable of receiving the spring and the first hub.

22. The projecting apparatus of claim 21, further comprising a wireless remote, wherein the wireless remote is removably attachable over a lens of the projector.

23. The projecting apparatus of claim 21, further comprising an extension disposed on the casing in a first configuration, wherein the extension is capable of supporting the casing in a second configuration.

24. The projecting apparatus of claim 23 wherein the extension is rotatable.

25. The projecting apparatus of claim 23 wherein the extension is flush with the casing in the first configuration and rotates away from and supports the casing in the second configuration.

26. The projecting apparatus of claim 21 further comprising a handle disposed within the casing.

* * * * *